United States Patent [19]
Yan

[11] Patent Number: 5,338,463
[45] Date of Patent: Aug. 16, 1994

[54] WASTEWATER TREATMENT BY CATALYTIC OXIDATION

[75] Inventor: Tsoung Y. Yan, Philadelphia, Pa.

[73] Assignee: Mobil Oil Corporation, Fairfax, Va.

[21] Appl. No.: 61,127

[22] Filed: May 12, 1990

[51] Int. Cl.⁵ .............................................. C02F 1/74
[52] U.S. Cl. ..................................... 210/763; 210/916
[58] Field of Search ......................... 210/762, 763, 916

[56] References Cited

U.S. PATENT DOCUMENTS

| | | | |
|---|---|---|---|
| 3,650,949 | 3/1972 | Hager et al. | 210/36 |
| 3,672,836 | 6/1972 | Brown | 210/763 |
| 4,582,690 | 4/1986 | Rempel et al. | 210/763 |
| 4,699,720 | 10/1987 | Harada et al. | 210/763 |
| 4,743,381 | 5/1988 | Bull | 210/759 |
| 4,814,545 | 3/1989 | Rule et al. | 210/763 |
| 4,830,999 | 5/1989 | Drago et al. | 502/74 |
| 4,925,569 | 5/1990 | Chou et al. | 210/763 |
| 4,992,181 | 2/1991 | Siebert | 210/763 |
| 5,112,494 | 5/1992 | Yan | 210/668 |
| 5,207,927 | 5/1993 | Marinangeli et al. | 210/763 |

FOREIGN PATENT DOCUMENTS

| | | | |
|---|---|---|---|
| 919443 | 2/1963 | Japan | 210/763 |
| 42851 | 4/1979 | Japan | 210/763 |
| 124558 | 9/1979 | Japan | 210/763 |

OTHER PUBLICATIONS

Beychok, Aqueous Wastes from Petroleum and Petrochemical Plants, pp. 208-211, John Wiley, 1967.
Abegg et al., Oxidation of Sulfide-Containing Refinery Wastes by Air, Chem. Abst. vol. 58, pp. 3195-3196.

*Primary Examiner*—Neil McCarthy
*Attorney, Agent, or Firm*—A. J. McKillop; D. P. Santini; G. L. Harris

[57] ABSTRACT

Waste water chemical oxygen demand is reduced from a waste water by passing the water in the presence of an oxidizing agent through an adsorbent porous solid substrate, preferably zeolite A, zeolite X, zeolite Y, ZSM-5, erionite, chabasite or activated carbon which has been partially ion exchanged with a water insoluble metal compound, preferably copper (Cu), that facilitates oxidation of the components in the waste water that increase its chemical oxygen demand, such as sulfide, thiosulfate, sulfite, mercaptan, or disulfide. The preferred oxidizing agent is air.

12 Claims, 2 Drawing Sheets

WASTEWATER TREATMENT BY CATALYTIC OXIDATION

FIELD OF THE INVENTION

This invention is directed to reducing the chemical oxygen demand of waste water by oxidizing various compounds including, for example, sulfides, sulfites, thiosulfates, mercaptans, and disulfides using an adsorbent substrate treated with a water insoluble compound along with a source of oxygen.

BACKGROUND OF THE INVENTION

Waste water streams from industrial plants, including petroleum refineries, chemical plants, pulp and paper plants, mining operations and food processing plants, can contain toxic substances such as cyanides, sulfides, sulfites, thiosulfates, mercaptans, and disulfides that tend to increase the chemical oxygen demand (COD) of the waste water streams. Examples of these waste water streams in petroleum refineries include sourwater, sourwater stripper bottoms, and spent caustics. The Environmental Protection Agency (EPA) and various local agencies have placed limits on the allowable levels of these toxins in industrial waste water effluent streams.

The conventional methods for wastewater treatment include incineration, biological oxidation, and chemical oxidation using $H_2O_2$, $Cl_2$, $NaOCl$, $ClO_2$, and $KMnO_4$. The concentration of the toxin in the waste water may be too low to treat economically using conventional means.

U.S. Pat. No. 5,112,494 to Yan teaches a method of removing cyanide from cyanide-containing waste water utilizing a water insoluble metal compound deposited onto a porous adosrbent substrate, the entire disclosure of which is incorporated by reference herein. The patent also teaches that a process using a water insoluble metal compound deposited onto a porous adsorbent substrate is effective in reducing the chemical oxygen demand of cyanide-containing waste water by oxidizing the oxidizable components of the water.

It is well known that sulfides in waste water, including sourwater stripper bottoms or foul water, can be oxidized using air to reduce the chemical oxygen demand of the waste water. These air oxidization processes are commonly practiced in petroleum refineries. In these air oxidation processes, the sulfides are oxidized to thiosulfate as is shown in the following representation:

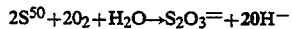

As noted in Abegg et. al. ("A Plant for Oxidation of Sulfide Containing Refinery Waste by Air", Ardol Kohle Erdgas Petrochemie, Sept. 1962), the reaction rate of sulfide to thiosulfate in the presence of air, as represented by equation (1) above, is relatively rapid. Unfortunately, the reaction rate of thiosulfate to sulfate as represented by equation (2) above, is extremely low, so that in an air oxidation process, most of the sulfides are converted to thiosulfate. A second, more severe process is required to oxidize the thiosulfate to sulfide. Based on Abegg's data, Beychok ("Aqueous Wastes from Petroleum and Petrochemical Plants," page 210 John Wiley, 1967) observed that, "To oxidize 34% of the sulfides to sulfates requires a tenfold increase in tower volume compared with units that oxidize the sulfides to thiosulfate." Thus, a catalyst is required to convert sulfides and thiosulfate efficitnely to sulfate.

Copper is an effective catalyst for oxidation of sulfides and thiosulfate. Beychok also observed that by use of homogeneous $CuCl_2$ catalyst, sulfides can be converted completely to sulfates. Continuous addition of a homogeneous catalyst to the treatment system is undesirable because of the chemical and operating costs, and most importantly, pollution of the treated water by copper.

In developing water treatment processes, particular concern is directed to processes which do not leave residues in the treated stream. Residues can cause additional disposal problems. Materials consumption and cost is also an important factor; thus, it is important to avoid processes which require replenishing the supply of costly catalyst and reagent.

SUMMARY OF THE INVENTION

A treatment method has now been discovered for waste water in which many toxins, including sulfides, sulfites, thiosulfates, mercaptans, and disulfides, that increase waste water chemical oxygen demand (COD) are found. The process catalytically oxidizes the toxins using a source of oxygen and an adsorbent substrate treated with a water insoluble compound.

DETAILED DESCRIPTION OF THE INVENTION

Figure 1A:
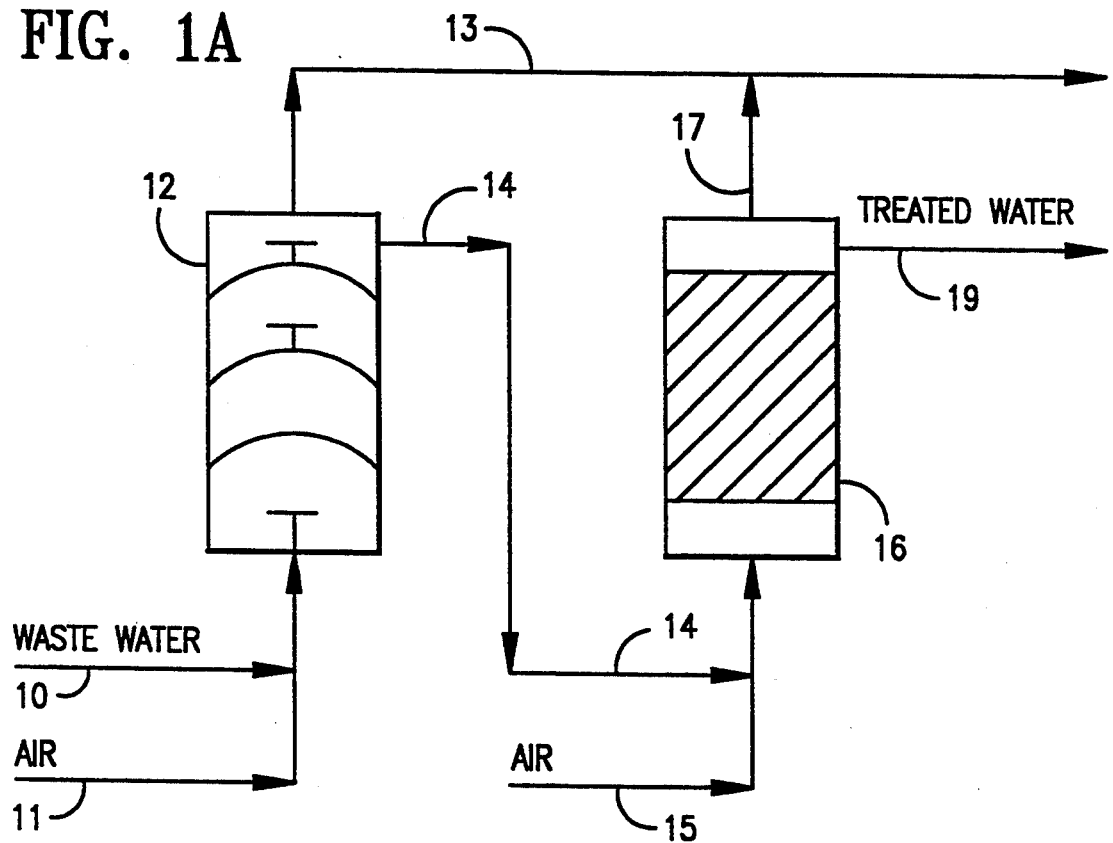
FIG. 1A is a simplified schematic diagram of the process to oxidize thiosulfates in accordance with the invention.

The invention is a process for oxidizing COD causing toxins, including sulfides, sulfites, thiosulfate, mercaptans, and disulfides from waste water through an adsorbent substrate treated with a water insoluble compound in the presence of a source of oxygen. The process is economically advantageous because it employs a long lasting adsorbent which effectively oxidizes the toxins, but does not require continuous replacement of the active adsorbent component and permits a single catalytic process to replace several other processes.

Waste water chemical oxygen demand (COD) can be reduced in the method of the present invention by feeding a waste water containing a reducing compound selected from sulfide, thiosulfate, sulfite, mercaptan, and/or disulfide along with a source of oxygen into a reaction zone containing a particular porous solid substrate having a water insoluble metal compound or water insoluble metal compounds deposited thereon. Then the waste water and the source of oxygen are contacted with the substrate which catalytically oxidizes the reducing compound, and the waste water is discharged from the reaction zone whereby the waste water has a substantially lower concentration of the reducing compound. The oxidation may be carried out under mild conditions which makes the present method easily incorporated into current refinery processes and easily retrofitted into existing refinery treating systems.

An object of the invention is to effectively and inexpensively reduce the COD of waste water containing reducing compounds, such as sulfides, sulfites, thiosulfate, mercantans, and disulfides. Another object of the invention is to provide a waste water treating process that consumes no chemicals that lead to additional waste disposal problems. A further objective of this invention is to provide a process that can be practiced by constructing a new processing unit or modifying an existing processing unit.

A feature of the invention is the reduction in waste water COD caused by sulfides, sulfites, thiosulfate, mercaptans, and disulfides by oxidizing the toxins using a source of oxygen over a water insoluble metal compound deposited on a porous adsorbent substrate.

An advantage of the invention is the reduced cost and improved efficiency in the reduction of waste water COD caused by sulfides, sulfites, thiosulfate, mercaptans, and disulfides by employing a porous adsorbent substrate treated with a water insoluble metal compound which catalyzes oxidation of the toxins.

A further advantage of this process is that the above catalysis may be accomplished in one process step.

A further advantage of this process is that the water insoluble metal compound is not leached from the porous adsorbent substrate and therefore does not create additional processing requirements.

A further advantage is that the process of this invention is effective to reduce the COD of cyanide-free waste water containing other reducing compounds, such as sulfides, sulfites, thiosulfates, mercaptans, and/or disulfides.

A further advantage of this invention is that this process can utilize as the substrate fresh and spent commercial hydrotreating catalysts, e.g. CoMo/Al$_2$O$_3$, NiMo/Al$_2$O$_3$, NiW/Al$_2$O$_3$, or Mo/Al$_2$O$_3$, hydrocracking catalysts, e.g. CoMo/Al$_2$O$_3$, NiMo/Al$_2$O$_3$, NiW/Al$_2$O$_3$, Mo/Al$_2$O$_3$, zeolites, or SiO$_2$/Al$_2$O$_3$, reforming catalysts, e.g. Pt/Al$_2$O$_3$ or Pt-Re/Al$_2$O$_3$, or hydrogenation catalysts, e.g. Pd/C, Ni/Kieselguhr, Pt/C, or Pt/Al$_2$O$_3$. Use of spent catalyst in this process is advantageous due to cost savings due to catalyst reuse and reduction in catalyst disposal requirements for spent catalyst. Careful selection of the specific commercial catalyst is required to avoid problems with the waste water leaching the metal from the catalyst. The preferred commercial catalyst for this process is spent hydrotreating catalyst, e.g. CoMo/Al$_2$O$_3$.

Adsorbent substrates which are useful in the method of this invention include porous, high surface area solids. A variety of porous solids can be employed for purposes of the invention. Non-limiting examples of porous solids for use herein include activated carbon, inorganic ion-exchange materials, polymeric resins (both gel and macro-reticulous types), titania, and zirconia.

Specific examples of the inorganic ion exchange materials include both the naturally occurring materials such as the mineral zeolites including mordenite, clinoptilolite, erionite, sepiolite, clays and synthetic material, which include Al$_2$O$_3$SiO$_2$, SiO$_2$—Al$_2$O$_3$, synthetic zeolites such as zeolite A, zeolite X, zeolite Y, ZSM-5 and mordenite.

Non-limiting examples of the water insoluble metal compounds which may be deposited on the porous substrate for use herein are those water insoluble compounds which contain a metal having oxidation properties, examples of which include Cu, Co, Ni, Fe, Ag, Cr, Mo, Bi, Hg, Pd, Pt, and Mn and mixtures thereof in the form of metal, sulfide, and oxide. The most important consideration in choosing the chemical state of the metal is its solubility in waste water or its leachability by the waste water. The metals selected should be very low in solubility in the waste water and in leachability by the waste water. The desired solubility in water is less than 10 ppm (preferably less than 1 ppm), which can be restated in terms of a desired solubility-product constant of $4 \times 10^{-10}$ or less. For example, CuS has a solubility-product constant of $8.5 \times 10^{-45}$ (at 18° C.). Represented in terms of the solubility of CuS in water: that is, the quantity of CuS that dissolves in a liter of water, CuS is substantially insoluble in water having an extremely low solubility of about $5.9 \times 10^{-21}$ g Cu/l. The metal contents in the catalyst can be from about 0.1 to 30wt % and preferably from about 0.5 to 20 wt.% based on the total catalyst weight.

The catalyst can be shaped in the form of extrudates, cylinders, multi-lobes, pellets, granules, or structure shaped (similar to the packings of static mixers).

It has been found that Cu can be leached from the porous adsorbent substrate when treating ammonia-containing waste water. The preferred way to avoid this Cu leaching problem is by limiting the amount of Cu exchanged onto a zeolite substrate, such as zeolite A, zeolite X, zeolite Y, ZSM-5, erionite, or chabasite, by partially ion exchanging the Cu onto the zeolite. The extent of the ion exchange should be limited to about 1% to about 90% (preferred about 5% to 75%) of the exchange capacity of the zeolite.

A packed bed provides an effective and efficient contactor. In the packed bed, the reaction zone proceeds along the direction of flow. To minimize the pressure drop across the bed and alleviate potential plugging by debris, the reactor can be operated with the bed expanded by greater than 5%. The reactor also can be operated at conditions for an ebullient bed, a fluidizing bed, or a spouting bed. The use of filters or guard beds may also be helpful to avoid plugging the catalyst bed.

Air, readily available, is the preferred oxidizing agent; however, other agents include ozone and molecular oxygen, O$_2$. Representations for the mechanisms for the various oxidation processes follow:

1. Oxidation of Sulfides $$S^= + 2O_2 \rightarrow SO_4^=$$

2. Oxidation of Sulfites $$SO_3^= + 0.5\ O_2 \rightarrow SO_4^=$$

3. Oxidation of Thiosulfates $$S_2O_3^= + 2O_2 + 2OH^- \rightarrow 2SO_4^= + H_2O$$

4. Oxidation of Mercaptans $$2RSH + 0.5\ O_2 \rightarrow RSSR + H_2O$$

5. Oxidation of Disulfides $$S_2 + 4O_2 \rightarrow 2SO_4^=$$

All the reaction products are innocuous. The treated water (oxidized effluent) is discharged, while the gas is treated, flared, or incinerated. Any skim oil present can be recovered in an oil-water separator, preferably a separator drum.

The invention can be incorporated into an existing waste water treatment system as shown in FIG. 1A where the waste water containing, for example, sulfides, flowing through line 10 is mixed with air flowing through line 11 and the combined stream is fed to an existing typical oxidizing tower unit 12 to convert most of the sulfides in the waste water to thiosulfate. Any resulting gases exit unit 12 via line 13. The oxidized water effluent containing the thiosulfate exits unit 12 via line 14 and is then mixed with air flowing in line 15 and the combined stream passes through the reaction zone of this invention 16, containing the insoluble metal deposited on a porous adsorbent substrate, to convert the thiosulfate to sulfate. The reaction conditions for this invention to be maintained in reaction zone 16 are as follows:

| Process Variable | Broad Range | Preferred Range |
| --- | --- | --- |
| Pressure, psia | 10 to 1000 | 14.7 to 200 |
| Temperature, °F | 30 to 400 | 100 to 300 |
| LHSV, v/v Hr. | 0.1 to 100 | 1 to 20 |
| $O_2$ in Air/COD, mole/mole | 1 to 100 | 1 to 10 |
| pH | 6 to 12 | 7.5 to 10.5 |

Where LHSV is liquid hourly space velocity and COD is chemical oxygen demand.

The resulting gas is separated from the liquid and the excess gas, flowing through line 17, is subsequently treated, flared, or incinerated and then discharged. Treated liquid effluent, flowing through line 19, is the product low in chemical oxygen demand and can be discharged.

Figure 1B:
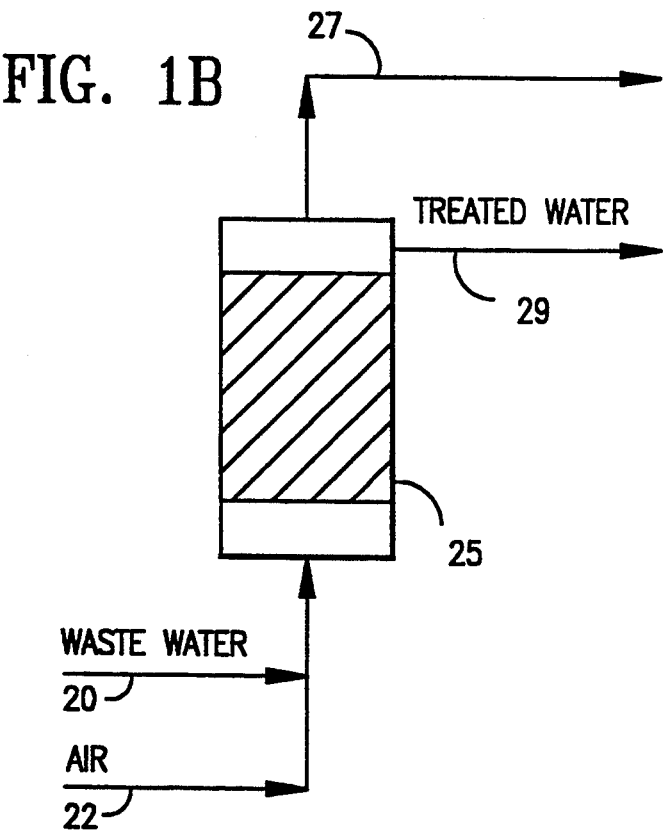
FIG. 1B is a simplified schematic diagram of the process to oxidize sulfides in accordance with the invention.

In the preferred form, the invention is carried out in a fixed bed contactor in the liquid phase which oxidizes sulfides directly to sulfates. As shown in a preferred embodiment of the process in FIG. 1B, waste water is passed through line 20 and is mixed with an oxidizing agent, preferably air, flowing through line 22 and the combined stream is fed to a fixed bed reaction zone 25, the reaction zone containing the catalyst required for the present invention, such as, for example, Cu partially ion exchanged onto zeolite A. The waste water flows at a liquid hourly space velocity (LHSV) ranging from about 0.1 to about 100 $hr^{-1}$, preferably from about 1 to about 20 $hr^{-1}$. The rate of flow of the water is attributable to the pressure imposed on the stream by the upstream processing unit. The reaction zone is maintained at the temperatures of the wastewater stream, ranging from about 30° F. to about 400° F., preferably from about 100° F. to about 300° F., and pressures ranging from about 10 to about 1000 psia, with about 14.7 to about 200 psia preferable The amount of oxidizing agent mixed with the waste water is sufficient to provide about 1 to about 100 (preferably about 1 to about 10) times the stoichiometric requirement for oxidizing the oxidizable components in the waste water which include sulfides, sulfites, thiosulfates, mercaptans, and/or disulfides (i.e. the chemical oxygen demand of the water). After oxidation in the reaction zone, the gas is separated from the treated effluent and is discharged through line 27 for additional treating, flaring, or incineration and the treated water, which is low in chemical oxygen demand, is discharged through line 29.

Figure 2:
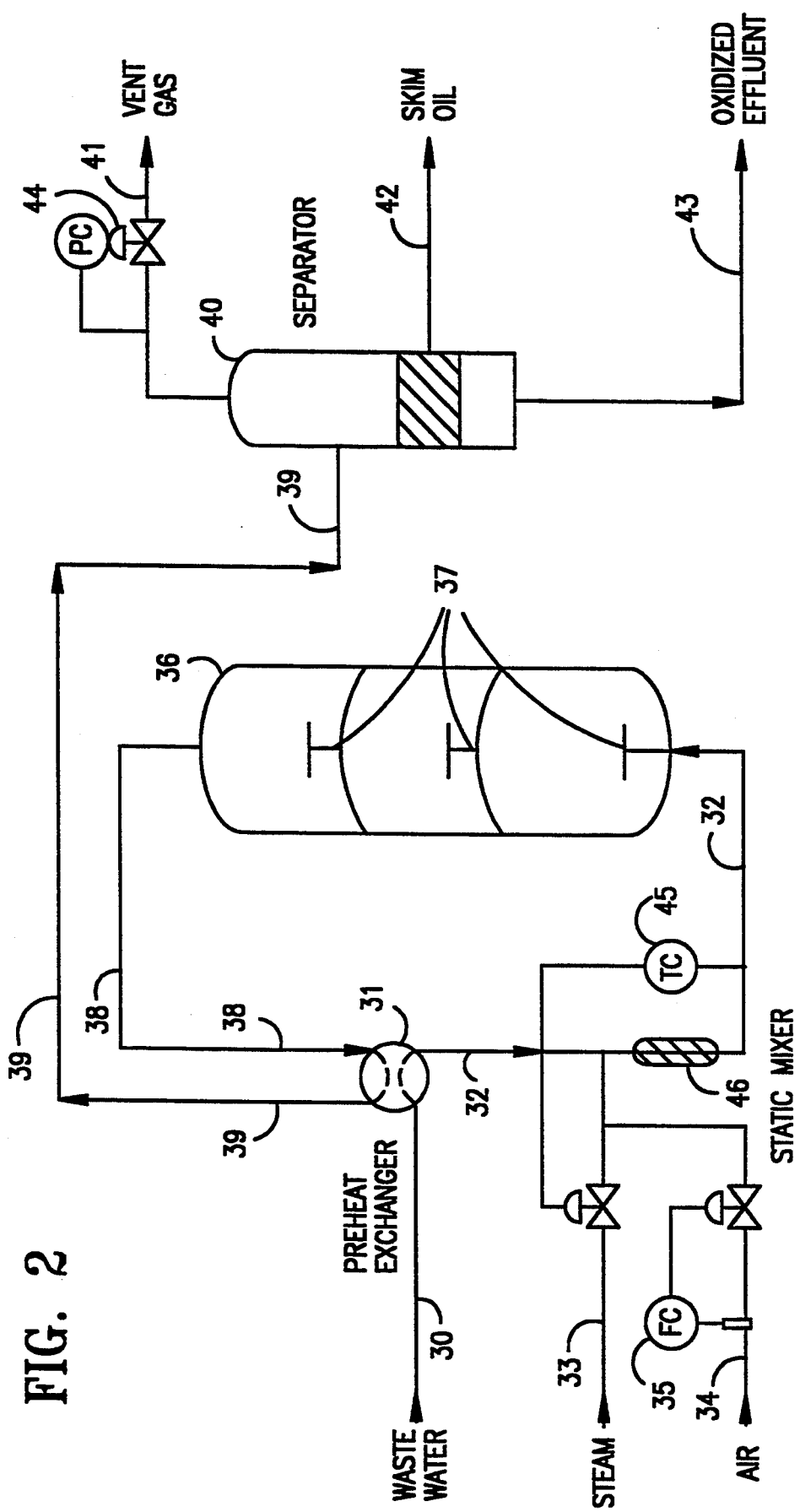
FIG. 2 is a simplified schematic diagram of a generalized typical oxidizing unit for waste water COD reduction.

An embodiment of this invention that is suitable for replacing an existing oxidizing unit is shown in FIG. 2. In this embodiment of the invention, waste water containing, for example, sulfides, is fed through line 30 to preheat exchanger 31 which heats the waste water, then is mixed with steam from line 33 and air from line 34 in a static mixer 46 contained in line 32 to promote complete mixing of the air and waste water. If required, steam from line 33, under the control of temperature control (TC) 45, is added to the waste water to increase the temperature of the waste water stream to the level desired by the refiner. The temperature of the process may range between about 100° F. and about 400° F., preferably about 150° F. to about 300° F. The air from line 34, under the control of flow control (FC) 35, is added to the waste water in a sufficient quantity to provide about 1 to about 100 (preferably about 1 to about 10) times the stoichiometric requirement of oxygen for oxidizing the oxidizable components in the waste water which include sulfides, sulfites, thiosulfates, mercaptans, and disulfides (i.e. the chemical oxygen demand of the water).

The water and air mixture is then fed through line 32 into the oxidizing tower 36 where it contacts the catalyst and the toxins are oxidized, thus reducing the chemical oxygen demand of the waste water. In the preferred embodiment, the catalyst is separated into three catalyst beds with interbed distribution and mixing nozzles 37. After leaving the oxidizing tower 36 via line 38, the mixture exchanges heat with the waste water feed in the preheat exchanger 31. The mixture then flows from the preheat exchanger 31 through line 39 to a separator drum 40.

In the separator drum, the gas is separated from the treated water. Any separable oil contained in the waste water feed is also separated from the gas and treated water products. The separated gas stream flows from the separator drum 40 through line 41 through a pressure control station 44 and to any required treating, flaring, or incineration. The skimmed oil flows from the separator drum 40 through line 42 to any needed recovery or reprocessing. The treated water flows from separator drum 40 through line 43 to discharge.

EXAMPLE

In an experimental embodiment of the invention, water insoluble Cu was deposited on the surface of a zeolite, Linde 13X extrudate. To make the catalyst, CuX-7, 5 g of the 13X extrudate was ion exchanged with 100 cc of 0.05N $Cu(NO_3)_2$ at 50° C. for 2 hours. After this ion exchange, the catalyst, CuX-7, contained about 3 wt.% cooper. Since the total inon exhange capacity of the 13X zeolite for copper is about 22 Wt.%, the CuX-7 was exchanged with copper to about 13.6% of its capacity. The CuX-7 was then heated in air to 450 °C. at 1° C./min. and was kept at 450° C. for 4 hours. Samples of petroleum refinery sulfide oxidation tower feed and product were obtained and analyzed. These samples were found to have the following characteristics:

| Sample | Thiosulfate, ppm | pH |
| --- | --- | --- |
| Sulfide oxidation tower feed | 9.6 | 8.6 |
| Sulfide oxidation tower product | 24.6 | 6.5 |

The test procedure included packing 2 cc of the CuX-7 catalyst (20×40 mesh) into a ¼" stainless steel tubular reactor. The test water was pumped upflow using a positive displacement pump while flowing air concurrently. The air flow rate was controlled using a mass flow meter at the lowest setting of 6.3 cc/min. The pressure was controlled at about 5 psig. The temperatures were varied through the test. The product was collected to analyze the thiosulfate concentration to determine the efficacy of the process at reducing the waste water thiosulfate concentration and by extension the waste water COD. The results of the test are shown in Table 1:

TABLE 1

Catalytic Oxidation of Sulfide Containing Water

| Run | Test Feed | Cumul. Bed Vol's | Temp. °C. | LHSV v/v Hr. | Pres. Psig | Air cc/cc | $S_2O_3^=$ ppm | $S_2O_3^=$ Red'n % |
|---|---|---|---|---|---|---|---|---|
| 1 | Effluent[1] | — | — | — | — | — | 24.6 | — |
| 2 | Effluent | 30 | 100 | 5 | 5 | 76 | 1.7 | 93 |
| 3 | Effluent | 113 | 100 | 5 | 5 | 76 | 1.9 | 92 |
| 4 | Feed[2] | — | — | — | — | — | 9.6 | — |
| 5 | Feed | 337 | 100 | 5 | 5 | 38 | 1.4 | 94[3] |
| 6 | Feed | 377 | 100 | 5 | 5 | 38 | 1.7 | 93[3] |
| 7 | Feed | 417 | 80 | 5 | 5 | 38 | 4.1 | 83[3] |
| 8 | Feed | 497 | 80 | 5 | 5 | 38 | 4.1 | 83[3] |
| 9 | Feed | 537 | 60 | 5 | 5 | 38 | 13.6 | 45[3] |
| 10 | Feed | 617 | 60 | 5 | 5 | 38 | 10.9 | 56[3] |
| 11 | Feed | 692 | 60 | 25 | 5 | 7.6 | 19.1 | — |
| 12 | Feed | 716 | 60 | 25 | 5 | 7.6 | 19.4 | — |
| 13 | Feed | 792 | 60 | 50 | 5 | 3.8 | 30.0 | — |
| 14 | Feed | 810 | 60 | 50 | 5 | 3.8 | 28.8 | — |
| 15 | Feed | 892 | 60 | 100 | 5 | 1.9 | 23.2 | — |
| 16 | Feed | 917 | 60 | 100 | 5 | 1.9 | 21.8 | — |
| 17 | Feed | 994 | 40 | 5 | 5 | 38 | 10.9 | — |

[1]Effluent is sulfide oxidizer tower effluent.
[2]Feed is sulfide oxidizer tower feed.
[3]These $S_2O_3^=$ reduction efficiencies are based upon the oxidation intermediate, thiosulfate, at 24.6 ppm.

I claim:

1. A method for reducing the chemical oxygen demand of waste water comprising the steps of:
    (a) feeding a cyanide-free wastewater containing a reducing compound selected from sulfide, thiosulfate, sulfite, mercaptan, or disulfide along with a source of oxygen into a reaction zone containing a porous solid substrate comprising a material selected from the group consisting of zeolite and activated carbon having a water insoluble copper compound deposited thereon;
    (b) contacting said waste water and said source of oxygen with said substrate at a temperature of less than 300 degrees F. and a pressure less than 200 psia which catalytically oxidizes said reducing compound; and
    (c) discharging the waste water from the reaction zone whereby said waste water has a substantially lower concentration of said reducing compound.

2. The method as described in claim 1 in which the water insoluble copper compound comprises a sulfide.

3. The method as described in claim 1 in which the water insoluble copper compound comprises an oxide.

4. The method as described in claim 1 in which the water insoluble copper compound comprises CuS, or $Cu_2S$.

5. The method as described in claim 3 in which the water insoluble copper compound comprises $Cu_2O$ or CuO.

6. The method as described in claim 1 in which the source of oxygen comprises air.

7. The method as described in claim 1 in which said waste water is fed to said reaction zone at a liquid hourly space velocity of 0.1 hr$^{-1}$ to 100 hr$^{-1}$.

8. The method as described in claim 1 in which the oxygen source is fed into said reaction zone in proportion to the feed rate of reducing compounds of 1 to 100 mole $O_2$/mole of reducing compound.

9. The method as described in claim 6 in which the air is fed into said reaction zone in proportion to the feed rate of reducing compounds of 1 to 100 mole $O_2$ in air/mole of reducing compound.

10. The method as described in claim 1 in which the porous solid substrate comprises a zeolite selected from zeolite A, zeolite X, zeolite Y, ZSM-5, erionite, chabasite.

11. The method as described in claim 1 in which said waste water feed is heated before entering said reaction zone.

12. The method as described in claim 1 in which said waste water feed and said source of oxygen are completely mixed before entering said reaction zone.

* * * * *

UNITED STATES PATENT AND TRADEMARK OFFICE
CERTIFICATE OF CORRECTION

PATENT NO.  :  5,338,463
DATED       :  August 16, 1994
INVENTOR(S) :  T. Y. Yan It is certified that error appears in the above-indentified patent and that said Letters Patent is hereby corrected as shown below:

Title Page:
Under item [22] "Filed: May 12, 1990", delete [1990] and insert "1993".

Signed and Sealed this

First Day of November, 1994

Attest:

Attesting Officer

BRUCE LEHMAN

Commissioner of Patents and Trademarks